US011042481B1

(12) United States Patent
Virani et al.

(10) Patent No.: US 11,042,481 B1
(45) Date of Patent: Jun. 22, 2021

(54) EFFICIENT PROCESSING OF COMMANDS IN A MEMORY SUB-SYSTEM

(71) Applicant: Micron Technology, Inc., Boise, ID (US)

(72) Inventors: Scheheresade Virani, Frisco, TX (US); Byron D. Harris, Mead, CO (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/720,674

(22) Filed: Dec. 19, 2019

(51) Int. Cl.
*G06F 12/00* (2006.01)
*G06F 12/0873* (2016.01)
*G06F 12/02* (2006.01)
*G06F 9/54* (2006.01)
*G06F 9/30* (2018.01)
*G06F 9/50* (2006.01)
*G06F 12/10* (2016.01)

(52) U.S. Cl.
CPC ...... *G06F 12/0873* (2013.01); *G06F 9/30047* (2013.01); *G06F 9/5022* (2013.01); *G06F 9/546* (2013.01); *G06F 12/02* (2013.01); *G06F 12/0246* (2013.01); *G06F 12/10* (2013.01); *G06F 2212/65* (2013.01); *G06F 2212/7201* (2013.01)

(58) Field of Classification Search
CPC ............. G06F 12/0873; G06F 9/30047; G06F 9/5022; G06F 9/546; G06F 12/0246; G06F 2212/7201; G06F 2212/65; G06F 12/10; G06F 12/02
See application file for complete search history.

(56) References Cited

U.S. PATENT DOCUMENTS

2008/0276036 A1* 11/2008 Van Acht ............ G06F 12/0246
711/103
2010/0241784 A1* 9/2010 Iyer ..................... G06F 12/0292
711/5
2011/0078393 A1* 3/2011 Lin ........................ G06F 3/0679
711/155
2017/0242603 A1* 8/2017 Sundararajan .......... G06F 3/067

* cited by examiner

*Primary Examiner* — John A Lane
(74) *Attorney, Agent, or Firm* — Lowenstein Sandler LLP (57) ABSTRACT

A read command is received from a host system, which operates on a first logical block address (LBA) range that at least partially overlaps with a second LBA range associated with a write command. A state associated with the write command is determined, where the state is indicative of whether a logical-to-physical (L2P) mapping table has been updated based on the write command. Data corresponding to the first LBA range is transmitted to the host system based on the state associated with the write command.

20 Claims, 5 Drawing Sheets

EFFICIENT PROCESSING OF COMMANDS IN A MEMORY SUB-SYSTEM

TECHNICAL FIELD

Embodiments of the disclosure relate generally to memory sub-systems, and more specifically, relate to efficient processing of commands in memory sub-systems.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to efficient processing of commands in memory sub-systems. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

The memory device can be a non-volatile memory device, which is a package of one or more dice. One example of non-volatile memory devices is a negative- and (NAND) memory device. Other examples of non-volatile memory devices are described below in conjunction with FIG. 1. Data operations can be performed by the memory sub-system. The data operations can be host-initiated operations. For example, the host system can initiate a data operation (e.g., write, read, erase, deallocate, etc.) on a memory sub-system. The host system can send access requests (e.g., write command, read command, deallocate command) to the memory sub-system, such as to store data on a memory device at the memory sub-system and to read data from the memory device on the memory sub-system. The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., ECC codeword, parity code), data version (e.g. used to distinguish age of data written), valid bitmap (which LBAs or logical transfer units contain valid data), etc.

Memory sub-systems can process read, write, and deallocate commands in the order in which they are received from a host system. Upon completion of these commands, the memory sub-system sends completion notifications back to the host system, which the host system interprets as an indication that the commands were completed in the same order in which they were sent to the memory sub-system. This order is important particularly in situations where the commands received by the memory sub-system operate on or overlap with the same LBA range. For example, if a deallocate command is sent to the memory sub-system and is followed by a write command and then a read command both to the same LBA range as the deallocate command, the host system expects that latest data is sent back by the read command, which would be the write data from the write command in this case. On the other hand, if a write command is sent and is followed by a deallocate command and then a read command both to the same LBA range as the write command, the read command should send back deallocated data (typically zeros) to the host.

In order to maintain the flow of commands, memory sub-systems can employ two tables that point to write data, which are implemented and maintained by the memory sub-system controller. The first table is referred to as the "logical-to-physical (L2P) mapping table," each entry of which maps an LBA to a corresponding physical address of the data block on the memory device. In the L2P mapping table can contain references or pointers to data that is physically stored in the memory device. When the L2P mapping table is updated based on a write command, the corresponding L2P entry will point to actual data stored in the memory device. By contrast, when the L2P mapping table is updated based on a deallocate command, it will not point to data stored on a memory device, but instead will contain a deallocate-specific marker which results in zeros being sent back to the host system in response to a subsequent read command.

The second table is referred to as a "coherency table," which maintains information regarding outstanding write data that is temporarily cached in a volatile memory of the memory sub-system. Upon updating the L2P mapping table and writing data to a memory device (e.g., a NAND memory device), the corresponding write data can be evicted from the cache and cleared from the coherency table. Deallocate commands do not have actual data content, and instead only include LBA ranges to be deallocated. Since no data is actually transferred from the host with deallocate commands, there is no data to store in the cache memory, and the coherency table is not updated. Instead, the deallocate command bypasses the coherency table operation and the L2P mapping table is updated with the deallocate-specific marker indicating that there is no data to be written to the memory device.

Compared to deallocate commands, the processing of write commands involves an additional step to process coherency table updates. This additional step can result in situations where a write command is currently in coherency and has not yet been processed to update the L2P mapping table while an overlapping deallocate command is received from the host system that bypasses the coherency table update for processing at the L2P level. If a subsequent read command is received, the memory sub-system is unable to reconcile which is the correct data to send back to the host system because no indication of order has been maintained.

Some conventional memory sub-systems can reconcile the order of these commands so that, once a deallocate command is received, the controller of the memory sub-system flushes all outstanding write data to the memory device. This ensures that the L2P mapping table is up-to-date and clears the coherency table. Although this is a relatively simple solution to ensure deterministic processing of the commands, this solution adversely may impact over-provisioning by forcing data to be flushed to the memory device before the data is fully aggregated, which leaves empty spaces in closed blocks. If there is a small buffer in the cache memory, flushing to the memory device will consume an entire data block.

Another disadvantage of conventional memory sub-systems is the amount of time required to flush data to the memory device. For large cache sizes, this typically requires that a significant amount of data is flushed before the deallocate command can be processed, resulting in delays. Such operations can delay the processing of the deallocate command to exceed the 500-millisecond maximum time required by some systems.

Aspects of the present disclosure address the above and other deficiencies by providing a memory sub-system that tracks updates to an L2P mapping table based on write commands to maintain the order in which commands are processed. Rather than forcing write data to be flushed to a memory device, the memory sub-system uses the coherency table and the L2P mapping table to determine the correct data to return to the host system in response to a read command. The memory sub-system can perform a coherency checking operation to determine whether an incoming read command operates on cached write data that is referenced by the coherency table. When this occurs (referred to herein as a "coherency hit"), the memory sub-system then determines whether the L2P mapping table has been updated based on the write command. If so, then the read command returns the data pointed to in the memory device by the L2P mapping table, which will correspond to the most up-to-date data regardless of whether a write command precedes a deallocate command or vice versa. If the L2P mapping table has not been updated based on the write command, the read command returns the locally cached write data.

Advantages of the present disclosure include, but are not limited to, avoiding the flushing of write data to the memory device in response to a deallocate command, which allows for faster and more efficient command processing. This beneficially reduces the impact on overprovisioning as there is no need to write data to the memory device until complete aggregation of data. This also beneficially avoids the time delays associated with flushing operations. Another advantage of the present disclosure is that the memory sub-system is able to read directly from the cache memory in situations where the L2P mapping table has not been updated. This allows the memory sub-system to bypass direct memory device reads, and increases the overall efficiency of the system. In addition, the memory sub-system is able to track the status of the write commands and maintain order by utilizing a flag that is set upon updating the L2P mapping table.

Figure 1:
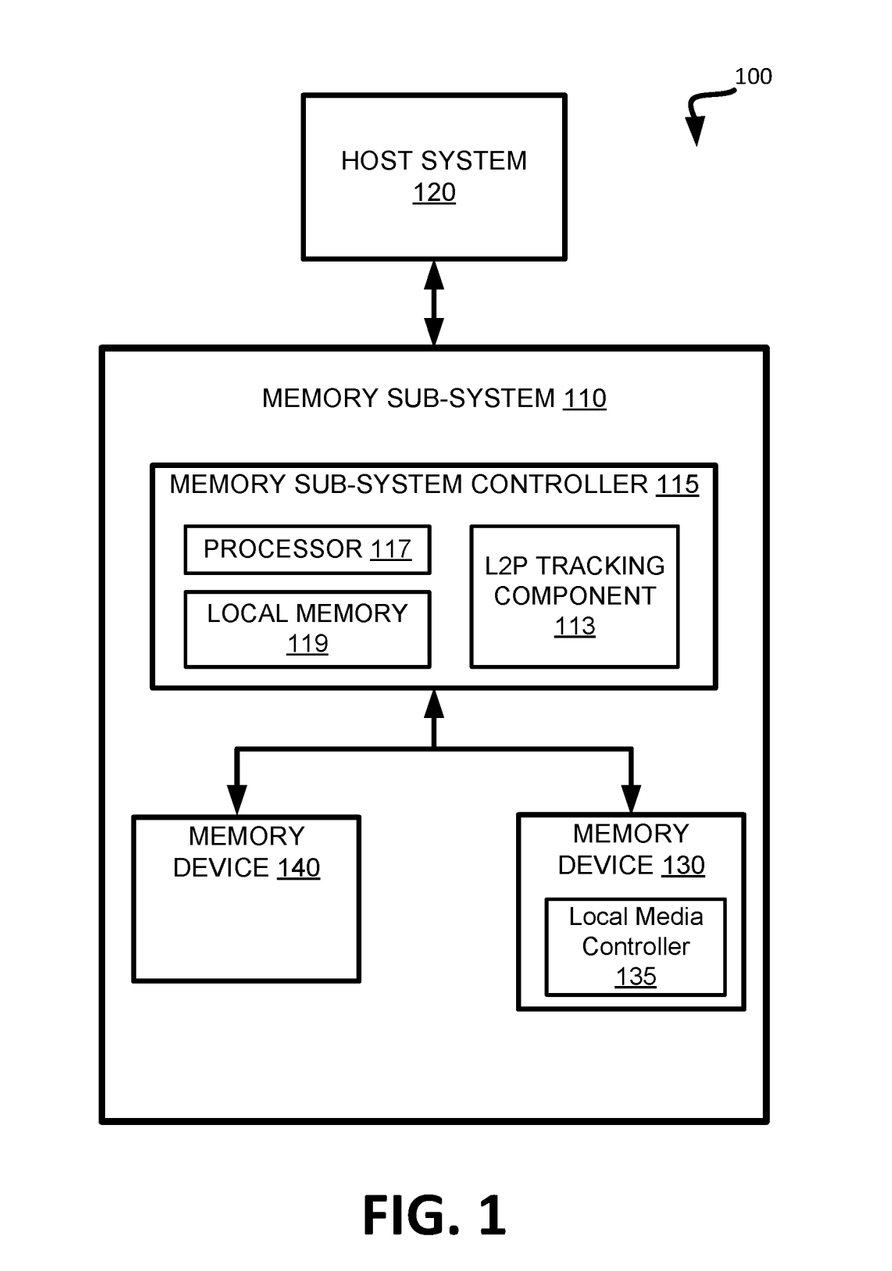
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset (e.g., processing device 118) and a software stack executed by the processor chipset. The processor chipset can include one or more cores, one or more caches, a memory controller (e.g., controller 115) (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include NAND type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative- or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address between a logical address (e.g., LBA, namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes an L2P tracking component 113 that can maintain the order of commands received from the host system 120 by tracking states of updates to an L2P mapping table maintained by the memory sub-system 110. In some embodiments, the memory sub-system controller 115 includes at least a portion of the L2P tracking component 113. For example, the memory sub-system controller 115 can include a processor 117 (processing device) configured to execute instructions stored in local memory 119 for performing the operations described herein. In some embodiments, the L2P tracking component 113 is part of the host system 120, an application, or an operating system.

The L2P tracking component 113 can determine when a read command operates on the same data range (e.g., an LBA range) as a previously received write command, and track updates to the L2P mapping table based on the write command (i.e., to determine if the L2P mapping table has been updated to include an L2P mapping entry that points to a physical address to which write data corresponding to the LBA range is to be written). The states of updates associated with write commands can be tracked by the L2P tracking component 113, for example, using a system managed tag (also referred to as a "SysTag") data structure. The SysTag data structure may be stored by the memory sub-system 110, for example, in a coherency table that manages data related to write commands. The SysTag data structure may include one or more data bits that can be used to store information identifying the states of L2P mapping table updates. Using this information, the L2P tracking component 113 keeps track of the order in which read, write, and deallocate commands are to be executed, and executes read commands based on the states of updates to the L2P mapping table while remaining agnostic as to the order of write and deallocate commands. This eliminates the flushing operation relied on by conventional memory sub-systems to maintain the order of commands.

Further details with regards to the operations of the L2P tracking component 113 are described below.

Figure 2:
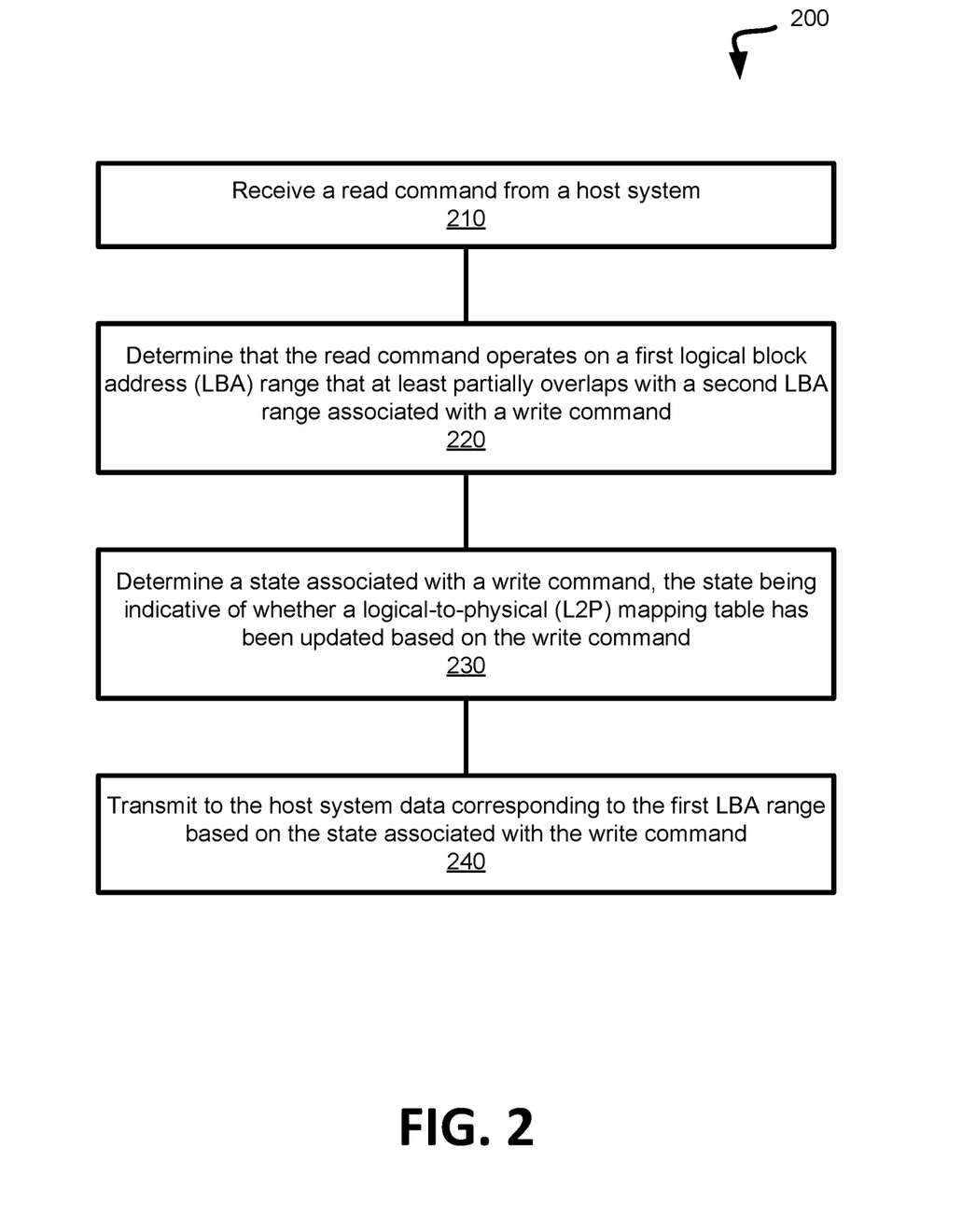
FIG. 2 is a flow diagram of an example method to process a read command based on a state associated with a write command received from a host system in accordance with some embodiments of the present disclosure.

FIG. 2 is a flow diagram of an example method 200 to process a read command based on a state associated with a write command (i.e., a state of an update to an L2P mapping table based on the write command) received from a host system (e.g., the host system 120), in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the L2P tracking component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, the processing device receives a read command from a host system. The read command includes an indication of an address to read data from. In an embodiment, the address is an LBA range.

At operation 220, the processing device determines that the read command operates on a LBA range that at least partially overlaps with a second LBA range associated with a write command. The write command is received by the processing device prior to the read command, and there may be one or more commands that are received by the processing device prior to the read command, such as other deallocate commands, other write commands, or other read commands. In an embodiment, first LBA range and the second LBA range overlap completely (i.e., the read is to operate on the same exact data that is to be written by the write command). In another embodiment, the first LBA range and the second LBA range only partially overlap.

In an embodiment, when the read command is received by the processing device, the processing device compares the first LBA range associated with the read command with entries in the coherency table to identify a write command having an overlapping LBA range (a "coherency hit"). The coherency table contains pointers that point to write data temporarily stored in a cache memory (until the write data is written to a memory device, such as a NAND memory device). In an embodiment, once write data of a particular write command is written to the memory device, that write data is cleared from the cache data, and the pointer to the write data is cleared from the coherency table.

At operation 230, the processing device determines a state associated with the write command, the state being indicative of whether the L2P mapping table has been updated based on the write command (e.g., the L2P mapping table has been updated to point to a physical address in the memory device to which the write data is to be written). In an embodiment, the state of the L2P mapping table is represented as a binary flag that is in either a first state or a second state. The first state of the binary flag is indicative that the L2P mapping table has been updated based on the write command. The second state of the binary flag is indicative that the L2P mapping table has not been updated based on the write command. In an embodiment, the processing device updates the binary flag once the L2P mapping table has been updated. In such embodiments, the write data is continuously stored in the cache memory until it is written to the memory device. In an embodiment, the flag is stored as a bit in a SysTag data structure maintained by the memory sub-system 110.

At operation 240, the processing device transmits to the host system data corresponding to the first LBA range (i.e., the LBA range specified by the read command) based on the state associated with the write command. In an embodiment, the processing device determines whether the binary flag is in the first state or the second state. If the processing device determines that the binary flag is in the first state (which is representative that the L2P mapping table has been updated based on the write command), the processing device then identifies an L2P mapping entry in the L2P mapping table corresponding to the write command. The L2P mapping entry is generated as an update in the L2P mapping table that points to a physical address in the memory device to which the write data (i.e., locally cached write data associated with the write command) is to be written. The L2P mapping entry can be present even before the write data is actually written to the memory device. In an embodiment, if the processing device determines that the L2P mapping entry points to a physical location in the memory device corresponding to the first LBA range, the processing device then transmits locally cached write data corresponding to the first LBA range to the host system.

In an embodiment where a deallocate command is received by the processing device after the write command, the L2P mapping entry for the particular LBA range specified by the read command (i.e., the first LBA range) can point to an unmapped marker rather than an actual physical address in the memory device. In such an embodiment, if the processing device determines that the L2P mapping entry comprises an unmapped marker, the processing device then transmits zero-filled data corresponding to the first LBA range to the host device.

In an embodiment, if the processing device determines that the binary flag is in the second state (i.e., which is representative that the L2P mapping table has not been updated based on the write command), the processing device transmits locally cached write data corresponding to the first LBA range to the host system. This would occur, for example, in a scenario in which no deallocate command was received between receiving the write command and the read command.

The processing device can receive a deallocate command before receiving the read command and after receiving the write command, and the deallocate command can operate on a third LBA range that at least partially overlaps with the second LBA range (e.g., the LBA range associated with the write command). In such an embodiment, the processing device transmits the data corresponding to the first LBA range based on the determined state of the L2P mapping table, as discussed above, but without flushing cached write data to the memory device prior to receiving the read command.

Figure 3:
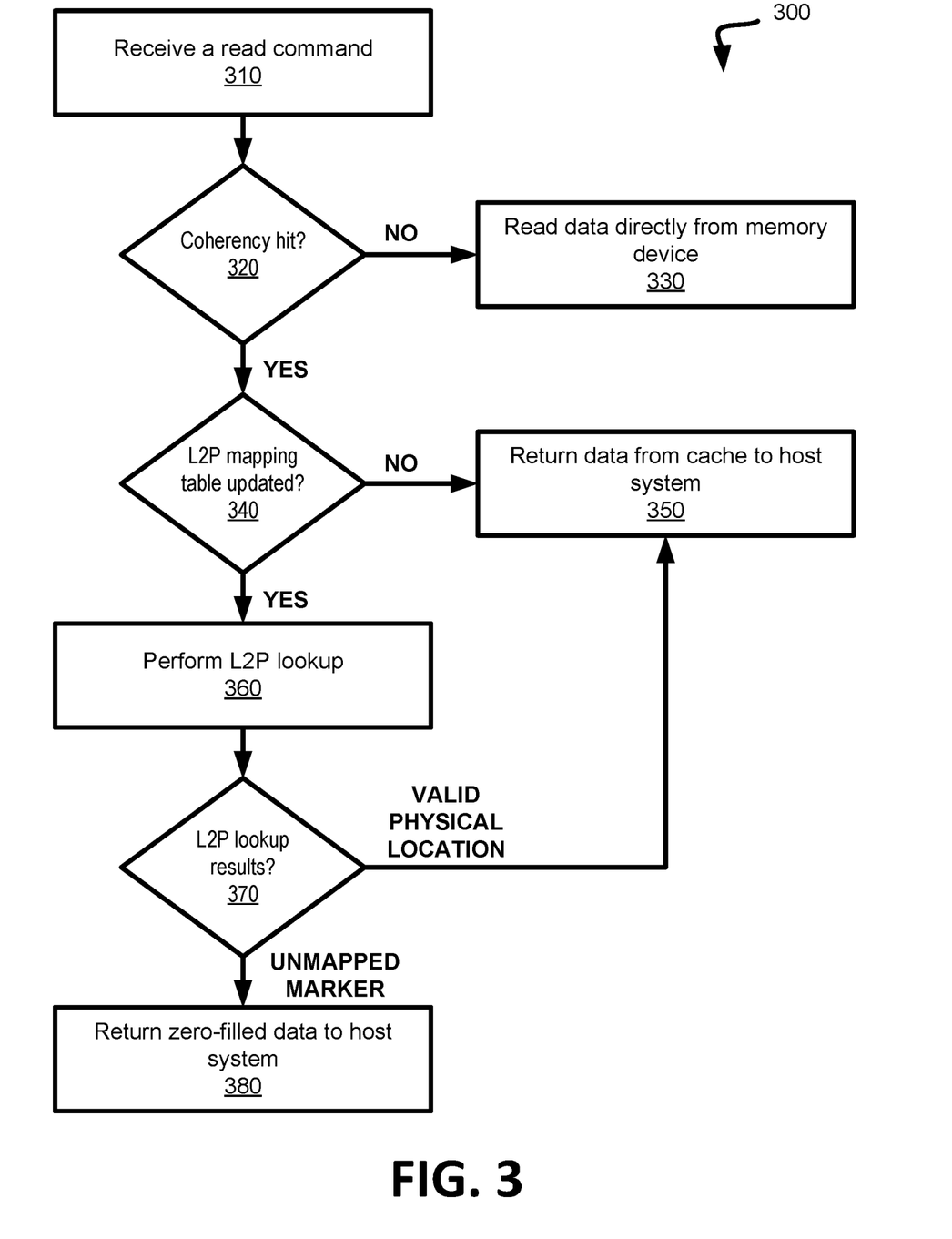
FIG. 3 is a flow diagram of an example method to process a read command depending on the order in which write and deallocate commands are received from a host system in accordance with some embodiments of the present disclosure.

FIG. 3 is a flow diagram of an example method 300 to process a read command depending on the order in which write and deallocate commands are received from a host system, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the L2P tracking component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing device receives a read command. Operation 310 may be performed in the same manner as operation 210 described with respect to FIG. 2.

At operation 320, the processing device determines whether a coherency hit has occurred, for example, by identifying a write command that operates on a same LBA range as the read command. If a coherency hit has not occurred, the method 300 then proceeds to operation 330, where the processing device causes data to be read directly from the memory device and transmitted to the host system (e.g., the host system 120). For example, the processing device can use an L2P mapping table to determine whether the L2P mapping table refers to a physical address in the memory device based on the LBA range of the read command (referred to herein as an "L2P lookup"). The data of that physical address is then read directly from the memory device and transmitted to the host system.

If a coherency hit has occurred, the method 300 then proceeds to operation 340 where the processing device determines whether the L2P mapping table has been updated based on the identified write command. If the L2P mapping table has not been updated based on the write command (e.g., the write command is still being processed), the method 300 then proceeds to operation 350, where the read command returns data stored in a cache memory (for the LBA range specified by the read command) to the host system.

If the L2P mapping table has been updated based on the write command, the method 300 then proceeds to operation 360, where the processing device performs an L2P lookup for the LBA range of the read command.

At operation 370, the processing device determines whether the L2P lookup resulted in a reference to valid physical data in the memory device or an unmapped marker. If the L2P lookup resulted in a reference to a valid physical location in the memory device, the method 300 then proceeds to operation 350. If the L2P lookup resulted in an unmapped marker (i.e., a deallocate-specific marker), the method 300 then proceeds to operation 380, where the read command returns zero-filled data representative of deallocation to the host system.

Figure 4:
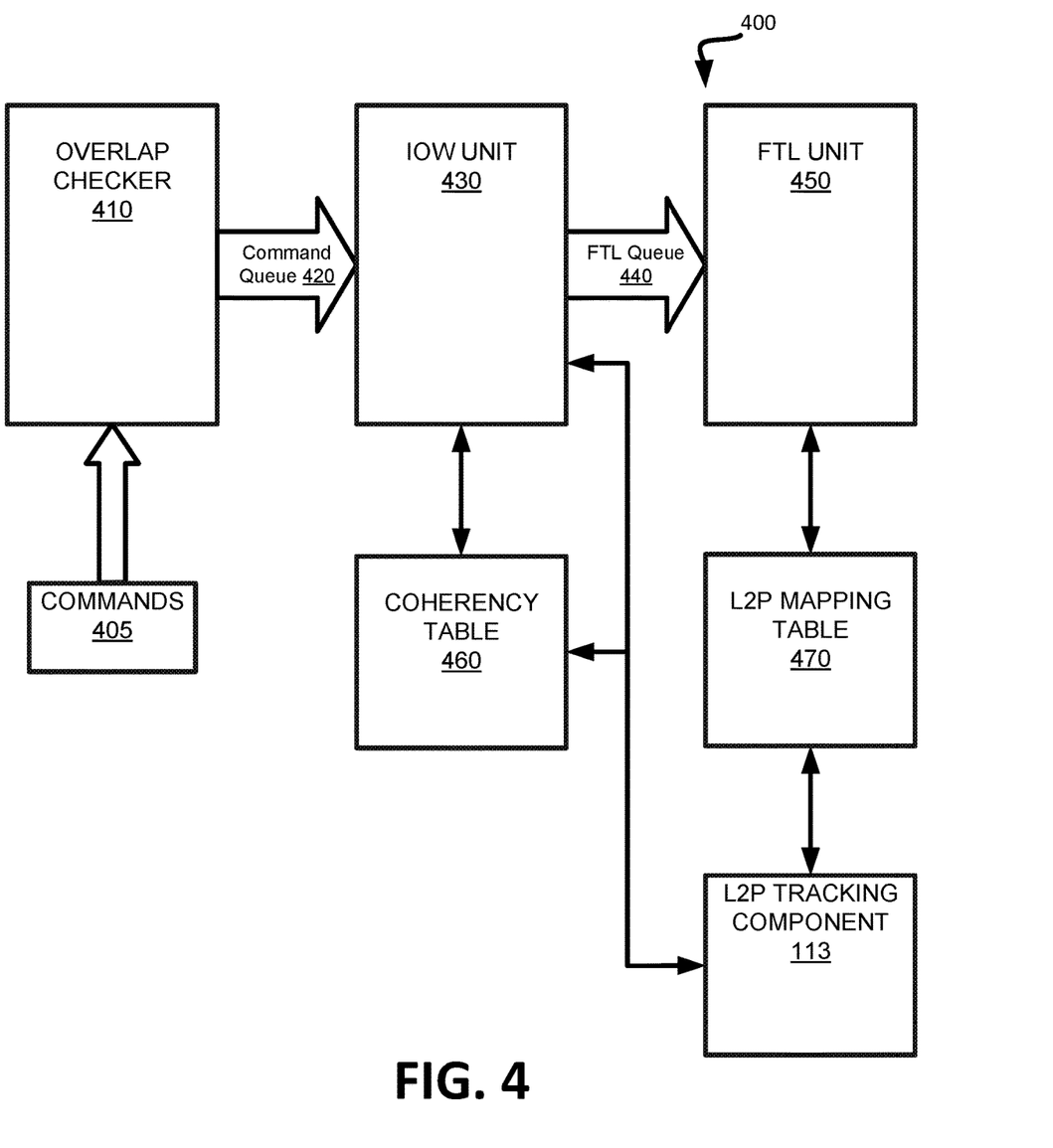
FIG. 4 is a diagram illustrating a system utilizing an L2P tracking component in accordance with some embodiments of the present disclosure.

FIG. 4 is a diagram illustrating a system 400 utilizing the L2P tracking component 113 in accordance with some embodiments of the present disclosure. The system 400 includes an overlap checker 410, a command queue 420, an input/output write (IOW) unit 430, and a flash transition layer (FTL) queue 440. The system 400 further includes an FTL unit 450, a coherency table 460, and an L2P mapping table 470 that are, in an embodiment, controlled by the L2P tracking component 113. In an embodiment, the overlap checker 410 is implemented in hardware, while the remaining components in the system 400 are implemented in firmware. In other embodiments, some or all of the components in the system 400 can be implemented in hardware, and some or all of the components in the system 400 can be implemented in firmware.

The system 400 receives commands 405 from a host system (e.g., the host system 120). The commands 405 can include read, write, and deallocate commands, and will be received by the system 400 in an order in which the host system requires that they be executed. In the system 400, the commands 405 are first processed by an overlap checker 410. In an embodiment, the overlap checker 410 maintains the order in which commands are received by blocking subsequent commands that operate on the same range of data as earlier commands until the earlier commands are completed. For example, if an incoming command is received by the system 400, the overlap checker 410 determines whether the incoming command operates on a range of data that overlaps with the same range of data as a command in progress. If there is an overlap, the incoming command will be deferred and held by the overlap checker 410 until the command in progress is completed, after which the incoming command will be injected into the command queue 420 and sent to the IOW unit 430. In an embodiment, the overlap checker 410 maintains order by preventing the command queue 420 from including two or more commands that operate on the same LBA range.

In general, read commands and write commands are deemed to be in progress until the host system receives a corresponding completion notification from the system 400. A write command can be considered complete once its associated write data has been locally cached even before the L2P mapping table 470 is updated based on the write command. A deallocate command is deemed to be in progress until it is processed by the FTL unit 450 and the L2P mapping table 470 is updated accordingly.

In an embodiment, the IOW unit 430 controls data transfer for write commands (e.g., by temporarily storing write data in a local cache memory before it is written to the memory device), and updates the coherency table 460 to maintain information describing the cached write data. After processing a write command, the IOW unit 430 injects the write command into the FTL queue 440.

In an embodiment, the FTL unit 450 process commands received from the FTL queue 440. For each write command received, the FTL unit 450 will compute a mapping between an LBA associated with write command and physical address range in a memory device. The computed mappings can be stored in the L2P mapping table 470. In general, once a command enters the FTL queue 440, the FTL unit 450 will process the commands one at a time to maintain order.

Generally, completed write commands will exist in one of three states: (1) the associated write data is locally cached; the L2P mapping table 470 has not yet been updated and is pointing to old data in the memory device; (2) the associated write data is locally cached; the L2P mapping table 470 has been updated based on the write command and points to an address in the memory device to which the write data is to be written; and (3) the associated write data has been written to the memory device, and has been cleared from the coherency table 460.

For a write command in state (1), if a deallocate command is received that operates on an LBA range that overlaps with the LBA range of the write command, operation on that LBA range by the deallocate command can be blocked by the overlap checker 410. In an embodiment, the deallocate command is delayed until the write command is injected into the FTL queue 440, and the deallocate command will be injected into the FTL queue 440 behind the write command to ensure that the write command is processed by the FTL unit 450 first. In an embodiment, when the write is processed by the FTL unit 450 and the L2P mapping table 470 is updated accordingly (i.e., the write command is now in state (2)), the L2P tracking component 113 updates a flag to indicate that the L2P mapping table 470 has been updated based on the write command.

Figure 5:
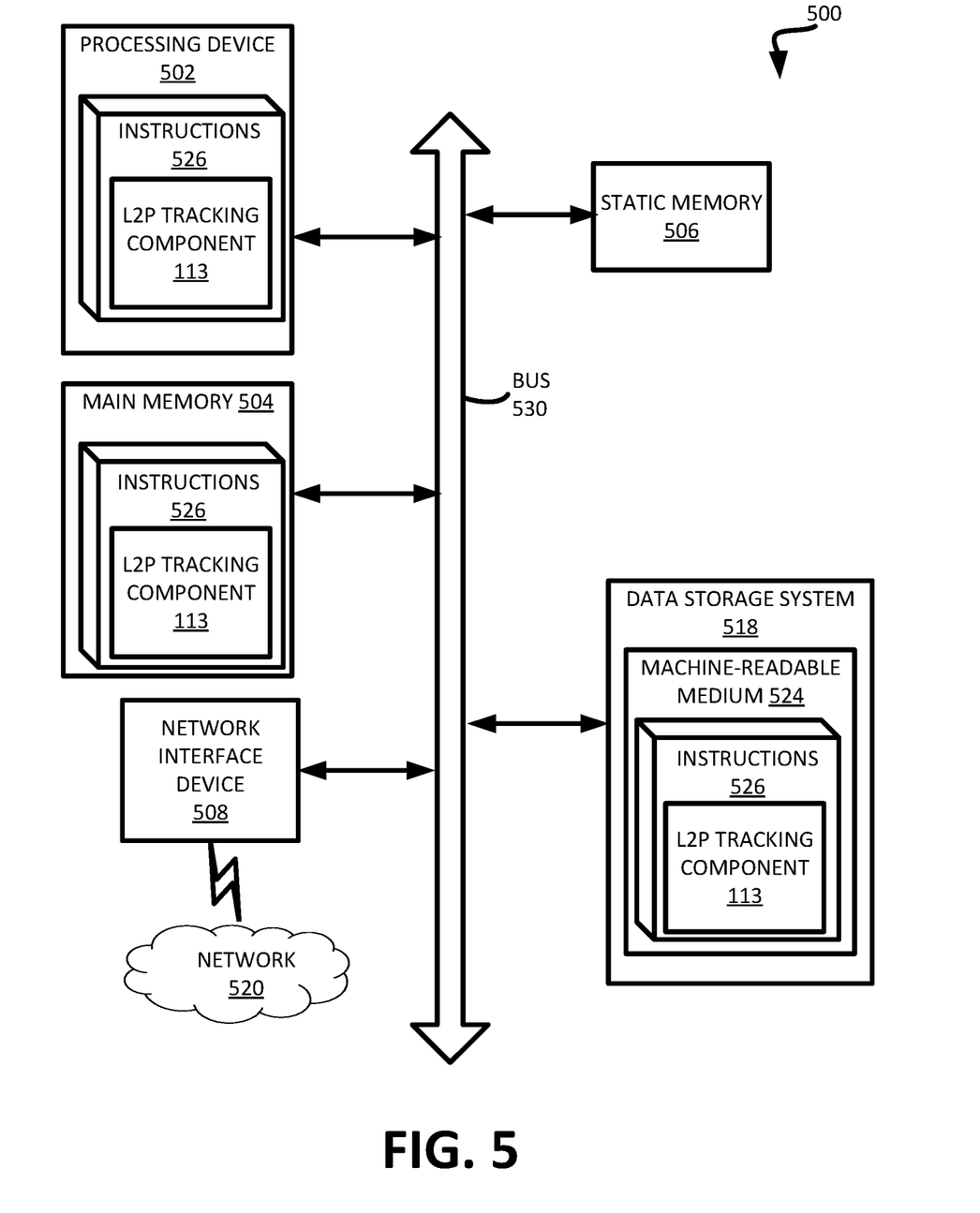
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the L2P tracking component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or RDRAM, etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to an L2P tracking component (e.g., the L2P tracking component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   receiving, by a processing device of a memory subsystem, a read command from a host system;
   determining, by the processing device, that the read command operates on a first logical block address (LBA) range that at least partially overlaps with a second LBA range associated with a write command, the write command being received by the processing device prior to the read command;
   determining, by the processing device, a state associated with the write command, the state being indicative of whether a logical-to-physical (L2P) mapping table has been updated based on the write command; and
   transmitting, by the processing device to the host system, data corresponding to the first LBA range based on the state associated with the write command.

2. The method of claim 1, wherein the state associated with the write command is represented by a binary flag, wherein a first state of the binary flag is indicative of the L2P mapping table having been updated based on the write command, and wherein a second state of the binary flag is indicative of the L2P mapping table having not been updated based on the write command.

3. The method of claim 2, further comprising:
   responsive to determining that the binary flag is in the first state, identifying, by the processing device, an L2P mapping entry in the L2P mapping table corresponding to the first LBA range,
   wherein transmitting the data corresponding to the first LBA range based on the state associated with the write command comprises:
      responsive to determining that the L2P mapping entry points to a physical location in a memory device corresponding to the first LBA range, transmitting, by the processing device, locally cached write data corresponding to the first LBA range to the host system; or
      responsive to determining that the L2P mapping entry comprises an unmapped marker, transmitting, by the processing device, zero-filled data to the host system.

4. The method of claim 2, further comprising:
   responsive to determining that the binary flag is in the second state, transmitting the data corresponding to the first LBA range based on the state associated with the write command comprises transmitting, by the processing device, locally cached write data corresponding to the first LBA range to the host system.

5. The method of claim 1, further comprising:
   receiving a deallocate command before receiving the read command and after receiving the write command, wherein the deallocate command operates on a third LBA range that at least partially overlaps with the second LBA range, and wherein transmitting the data corresponding to the first LBA range is performed without flushing cached write data to a memory device.

6. A system comprising:
   a memory device;
   a processing device, operatively coupled with the memory device, to:
      receive a read command from a host system;
      determine that the read command operates on a first logical block address (LBA) range that at least partially overlaps with a second LBA range associated with a write command, the write command being received by the processing device prior to the read command;

determine a state associated with the write command, the state being indicative of whether a logical-to-physical (L2P) mapping table has been updated based on the write command; and transmit, to the host system, data corresponding to the first LBA range based on the state associated with the write command.

7. The system of claim 6, wherein the state associated with the write command is represented by a binary flag, wherein a first state of the binary flag is indicative of the L2P mapping table having been updated based on the write command, and wherein a second state of the binary flag is indicative of the L2P mapping table having not been updated based on the write command.

8. The system of claim 7, wherein the processing device is to further:

responsive to determining that the binary flag is in the first state, identify an L2P mapping entry in the L2P mapping table corresponding to the first LBA range, wherein to transmit the data corresponding to the first LBA range based on the state associated with the write command, the processing device is to further:

responsive to determining that the L2P mapping entry points to a physical location in the memory device corresponding to the first LBA range, transmit locally cached write data corresponding to the first LBA range to the host system; or responsive to determining that the L2P mapping entry comprises an unmapped marker, transmit zero-filled data to the host system.

9. The system of claim 7, wherein the processing device is to further:

responsive to determining that the binary flag is in the second state, to transmit data corresponding to the first LBA range based on the state associated with the write command, the processing device is to transmit cached write data corresponding to the first LBA range to the host system.

10. The system of claim 6, wherein the processing device is to further:

receive a deallocate command before receiving the read command and after receiving the write command, wherein the deallocate command operates on a third LBA range that at least partially overlaps with the second LBA range, and wherein the processing device is to transmit the data corresponding to the first LBA range based on the state associated with the write command without flushing cached write data to a NAND memory prior to receiving the read command.

11. A system comprising:

a memory sub-system comprising:

a logical-to-physical (L2P) mapping table to maintain a mapping of logical block addresses to physical addresses;

a cache memory configured to store write data associated with write commands;

a flash transition layer (FTL) unit configured to map write data from logical block addresses to physical addresses and to update and maintain the L2P mapping table; and a processing device operatively coupled with the memory sub-system to perform operations comprising:

receiving a write command and a deallocate command from a host system;

storing write data associated with a write command received from a command queue in the cache memory;

determining that the L2P mapping table has been updated by the FTL unit based on the write command; and responsive to receiving a read command from the host system that operates on a same LBA range as the write command, transmitting the write data stored in the cache memory or zero-filled data to the host system depending on an order in which the write command and the deallocate command are received from the host system.

12. The system of claim 11, wherein the processing device is to perform further operations comprising:

transmitting the zero-filled data when the write command is received before the deallocate command; or transmitting the write data stored in the cache memory when the deallocate command is received before the write command.

13. The system of claim 11, wherein the memory sub-system further comprises:

a coherency table configured to maintain information about write data stored in the cache memory.

14. The system of claim 11, wherein the memory sub-system further comprises:

a command queue configured to receive and maintain an order of commands originating from a host system.

15. The system of claim 11, wherein the memory sub-system further comprises:

an input/output write (IOW) unit configured to process commands and store write data associated with write commands in the cache memory; and an FTL queue configured to receive and maintain an order of commands processed by the IOW unit.

16. A non-transitory computer-readable storage medium comprising instructions that, when executed by a processing device, cause the processing device to:

receive a read command from a host system;

determine that the read command operates on a first logical block address (LBA) range that at least partially overlaps with a second LBA range associated with a write command, the write command being received by the processing device prior to the read command;

determine a state associated with the write command, the state being indicative of whether a logical-to-physical (L2P) mapping table has been updated based on the write command; and transmit, to the host system, data corresponding to the first LBA range based on the state associated with the write command.

17. The non-transitory computer-readable storage medium of claim 16, wherein the state associated with the write command is represented by a binary flag, wherein a first state of the binary flag is indicative of the L2P mapping table having been updated based on the write command, and wherein a second state of the binary flag is indicative of the L2P mapping table having not been updated based on the write command.

18. The non-transitory computer-readable storage medium of claim 17, wherein the processing device is to further:

responsive to determining that the binary flag is in the first state, identify an L2P mapping entry in the L2P mapping table corresponding to the first LBA range, wherein to transmit the data corresponding to the first LBA range based on the state associated with the write command, the processing device is to further:

responsive to determining that the L2P mapping entry points to a physical location in a memory device corresponding to the first LBA range, transmit locally cached write data corresponding to the first LBA range to the host system; or responsive to determining that the L2P mapping entry comprises an unmapped marker, transmit zero-filled data to the host system.

19. The non-transitory computer-readable storage medium of claim 17, wherein the processing device is to further:

responsive to determining that the binary flag is in the second state, to transmit data corresponding to the first LBA range based on the state associated with the write command, the processing device is to transmit cached write data corresponding to the first LBA range to the host system.

20. The non-transitory computer-readable storage medium of claim 16, wherein the processing device is to further:

receive a deallocate command before receiving the read command and after receiving the write command, wherein the deallocate command operates on a third LBA range that at least partially overlaps with the second LBA range, and wherein the processing device is to transmit the data corresponding to the first LBA range based on the state associated with the write command without flushing cached write data to a memory device prior to receiving the read command.

* * * * *